(12) United States Patent
Saito

(10) Patent No.: US 11,793,692 B2
(45) Date of Patent: Oct. 24, 2023

(54) SINGLE-HANDEDLY OPERABLE WHEELCHAIR

(71) Applicant: RESEARCH INSTITUTE FOR LIFE SPACE, LLC, Sapporo (JP)

(72) Inventor: Toru Saito, Sapporo (JP)

(73) Assignee: RESEARCH INSTITUTE FOR LIFE SPACE, LLC

( * ) Notice: Subject to any disclaimer, the term of this patent is extended or adjusted under 35 U.S.C. 154(b) by 550 days.

(21) Appl. No.: 17/146,495

(22) Filed: Jan. 12, 2021

(65) Prior Publication Data

US 2021/0128376 A1    May 6, 2021

Related U.S. Application Data

(63) Continuation of application No. PCT/JP2019/013124, filed on Mar. 27, 2019.

(30) Foreign Application Priority Data

Jul. 18, 2018 (JP) .................................. 2018-134754
Nov. 21, 2018 (JP) .................................. 2018-217990

(51) Int. Cl.
A61G 5/02      (2006.01)
F16D 27/12     (2006.01)
F16D 27/04     (2006.01)

(52) U.S. Cl.
CPC ............ *A61G 5/022* (2013.01); *A61G 5/023* (2013.01); *F16D 27/12* (2013.01); *F16D 27/04* (2013.01)

(58) Field of Classification Search
CPC ........ A61G 5/022; A61G 5/023; F16D 27/12; F16D 27/04
See application file for complete search history.

(56) References Cited

U.S. PATENT DOCUMENTS 2,431,112 A * 11/1947 Everest .................... A61G 5/02
                                                    280/211
5,112,072 A *  5/1992 Korosue .................. A61G 5/02
                                                    280/270

(Continued)

FOREIGN PATENT DOCUMENTS

JP       S46-13386 U     5/1971
JP       2004-141452 A   5/2004

(Continued)

OTHER PUBLICATIONS

International Search Report for PCT/JP2019/013124 dated Jun. 11, 2019.

*Primary Examiner* — Kevin Hurley
*Assistant Examiner* — Hosam Shabara
(74) *Attorney, Agent, or Firm* — Yokoi & Co., U.S.A.; Toshiyuki Yokoi

(57) ABSTRACT

Provided is a wheelchair that can be operated easily with either a right or left hand. The wheelchair is provided with; right and left handrims; a rotary shaft for transmitting a rotational force generated by a handrim on one side to a wheel on the opposite side via a drive mechanism; and a wheel hub for transmitting the rotational force generated by the handrim on the one side to the wheel on the same side via the drive mechanism, wherein the drive mechanism includes two pairs of right and left sensors respectively disposed on an outer surface of each of the handrims, a first non-excitation electromagnetic clutch for transmitting the rotational force to the right wheel, a second non-excitation electromagnetic clutch for transmitting the rotational force to the wheel on the opposite side, and a third non-excitation electromagnetic clutch for transmitting the rotational force to the left wheel.

2 Claims, 10 Drawing Sheets

(56) References Cited

U.S. PATENT DOCUMENTS

| | | | | |
|---|---|---|---|---|
| 5,306,035 A | * | 4/1994 | Counts | A61G 5/0825 |
| | | | | 280/270 |
| 6,279,934 B1 | * | 8/2001 | Womack | A61G 5/0825 |
| | | | | 280/250.1 |
| 11,141,329 B2 | * | 10/2021 | Saito | A61G 5/022 |
| 11,191,682 B2 | * | 12/2021 | Saito | A61G 5/048 |
| 2009/0039612 A1 | | 2/2009 | Bidwell et al. | |
| 2012/0231922 A1 | * | 9/2012 | Byun | A61G 5/1054 |
| | | | | 475/311 |
| 2020/0214915 A1 | | 7/2020 | Saito | |

FOREIGN PATENT DOCUMENTS

| | | |
|---|---|---|
| JP | 2006-55630 A | 3/2006 |
| JP | 2010-75534 A | 4/2010 |
| JP | 2010-279666 A | 12/2010 |
| JP | 5105256 B | 12/2012 |
| JP | 6288746 B | 3/2018 |

\* cited by examiner

FIG. 9

| | Handrim operation sequence | Third non-excitation electromagnetic clutch 150b (Left wheel) | Second non-excitation electromagnetic clutch 148a (Right wheel) | First non-excitation electromagnetic clutch 146a (Right wheel) |
|---|---|---|---|---|
| Right hand operation | 20a3 · 20a4 At the same time Move forward (see FIG. 11A) | × (Connection) | × (Connection) | × (Connection) |
| | 20a3 → 20a4 Turn right (see FIG. 10A) | × (Connection) | × (Connection) | ○ (Disconnection) |
| | 20a4 → 20a3 Turn left (see FIG. 10B) | × (Connection) | ○ (Disconnection) | × (Connection) |
| Left hand operation | 20b3 · 20b4 At the same time Move forward (see FIG. 11B) | × (Connection) | × (Connection) | × (Connection) |
| | 20b3 → 20b4 Turn left (see FIG. 10C) | ○ (Disconnection) | × (Connection) | × (Connection) |
| | 20b4 → 20b3 Turn right (see FIG. 10D) | × (Connection) | ○ (Disconnection) | × (Connection) |
| Both hand operation | 20a3 and/or 20a4 and 20b3 and/or 20b4 Move forward or Turn right or left (see FIG. 11C) | × (Connection) | ○ (Disconnection) | × (Connection) |

○ : Energized   × : Non- energized

SINGLE-HANDEDLY OPERABLE WHEELCHAIR

CROSS-REFERENCES TO RELATED APPLICATIONS

This application claims the benefit of priority and is a Continuation application of the prior International Patent Application No. PCT/JP2019/013124, with an international filing date of Mar. 27, 2019, which designated the United States, and is related to the Japanese Patent Application No. 2018-217990, filed Jul. 18, 2018, the entire disclosures of all applications are expressly incorporated by reference in their entirety herein.

BACKGROUND OF THE INVENTION

1. Field of the Invention

The present invention relates generally to manual wheelchairs. More particularly, the present invention relates to a wheelchair which is equipped with a single handrim on each of left and right sides and which can be easily operated by a single hand.

2. Description of Related Art

A wheelchair is configured so that a wheelchair user (hereinafter, simply referred to as a "user") operates right and left wheels by his/her hand to move forward, backward, right turn, and left turn. However, it is difficult for a person with a disability on either the right or left side of the body to use a general wheelchair because they cannot use both hands freely. Therefore, a single-hand-operated wheelchair that can be operated by only a healthy hand, even if the right or left body is disabled, has been proposed (see Patent Document 1). The wheelchair described in Patent Document 1 is configured such that the wheelchair disposes a double handrim outside a wheel on a side, where a healthy half of the body of a user is located so that the movement of the wheelchair can be controlled by operating the handrim by the healthy hand.

Also, the wheelchair described in Patent Document 2 requires the operation of a lever, and the wheelchair described in Patent Document 3 requires a user to tilt his/her body to the right or left during operation, which is a physical burden. Furthermore, the wheelchair described in Patent Document 4 has an issue that the configuration corresponding to the constant speed movement is not shown. A wheelchair provided with a lever to operate the clutch connecting and disconnecting the left and right wheels has also been proposed (see Patent Document 5). Wheelchairs provided with a brake control device that uses sensors to prevent unexpected movements have also been proposed (see Patent Document 6).

The wheelchair described above was not easy to operate for a person with a disability on either the right or left side of the body. Therefore, the present inventor has proposed a wheelchair that can be easily operated by a person's healthy hand even if the person is a person with a disability on either the right or left side of the body (see Patent Document 7).
Patent Document 1: Japanese Examined Utility Model Application Publication No. 46-13386
Patent Document 2: Japanese Unexamined Patent Application Publication No. 2004-141452
Patent Document 3: Japanese Unexamined Patent Application Publication No. 2010-279666
Patent Document 4: Japanese Patent No. 5105256
Patent Document 5: Japanese Unexamined Patent Application Publication No. 2006-055630
Patent Document 6: Japanese Unexamined Patent Application Publication No. 2010-075534
Patent Document 7: Japanese Patent No. 6288746

BRIEF SUMMARY OF THE INVENTION

Since the wheelchair described in Patent Document 7 can be operated by a single hand, the wheelchair is convenient for a person with a half-body disability. It is also useful in sports using wheelchairs such as wheelchair tennis and wheelchair basketball. It is an object of the present invention to provide a wheelchair which is easy to operate by a single hand without the need to change grasping the handrim, which is pursued from a viewpoint different from the wheelchair described in Patent Document 7.

According to claim 1 of the present application, the present invention provides a single-handedly operable wheelchair having a frame, a right wheel and a left wheel, a right caster and a left caster, and a seat, the wheelchair including: a right-left pair of handrims concentrically disposed with an axle of each wheel and respectively connected to handrim spokes; a rotary shaft for transmitting a rotational force generated by a rotation of the handrim on one side to a wheel on the opposite side via a drive mechanism; and a pair of wheel hubs for transmitting the rotational force generated by the rotation of the handrim on the one side to the wheel on the same side via the drive mechanism. The drive mechanism includes two pairs of right and left sensors respectively disposed on the outer surface of each of the handrims, a first non-excitation electromagnetic clutch disposed on the right side of the wheelchair for transmitting the rotational force to the right wheel, a second non-excitation electromagnetic clutch disposed on the right side or the left side of the wheelchair for transmitting the rotational force to the wheel on the opposite side, and a third non-excitation electromagnetic clutch disposed on the left side of the wheelchair for transmitting the rotational force to the left wheel. Energization of the non-excitation electromagnetic clutches is controlled by presence or absence and/or order of contact of a palm and a thumb to each of the sensors. A first drive path formed by engaging a first surface-contacting engagement portion provided on the first non-excitation electromagnetic clutch and a fourth surface-contacting engagement portion provided on the right wheel hub is disconnected or connected depending on presence or absence of energization of the first non-excitation electromagnetic clutch. A second drive path formed by engaging a second surface-contacting engagement portion provided on the second non-excitation electromagnetic clutch and a fifth surface-contacting engagement portion provided on the rotary shaft is disconnected or connected depending on presence or absence of energization of the second non-excitation electromagnetic clutch. A third drive path formed by engaging a third surface-contacting engagement portion provided on the third non-excitation electromagnetic clutch and a sixth surface-contacting engagement portion provided on the left wheel hub is disconnected or connected depending on presence or absence of energization of the third non-excitation electromagnetic clutch. This configuration transmits the rotational force to the wheel on a desired side.

According to claim 2 of the present application, the present invention provides a single-handedly operable wheelchair having a frame, a right wheel and a left wheel, a right caster and a left caster, and a seat, the wheelchair including: a right-left pair of handrims concentrically disposed with an axle of each wheel and respectively connected to handrim spokes; a rotary shaft for transmitting a rotational force generated by a rotation of the handrim on one side to a wheel on the opposite side via a drive mechanism; and a pair of wheel hubs for transmitting the rotational force generated by the rotation of the handrim on the one side to the wheel on the same side via the drive mechanism. The drive mechanism includes two pairs of right and left sensors respectively disposed on the outer surface of each of the handrims, a first non-excitation electromagnetic clutch disposed on the right side of the wheelchair for transmitting the rotational force to the right wheel, a second non-excitation electromagnetic clutch disposed on the right side or the left side of the wheelchair for transmitting the rotational force to the wheel on the opposite side, and a third non-excitation electromagnetic clutch for transmitting the rotational force to the left wheel. Energization of the non-excitation electromagnetic clutches is controlled by presence or absence and/or order of contact of a palm and a thumb to each of the sensors. A first drive path formed by engaging a first spur gear or a first internal gear provided on the first non-excitation electromagnetic clutch and a fourth internal gear or a fourth spur gear provided on the right wheel hub is disconnected or connected depending on presence or absence of energization of the first non-excitation electromagnetic clutch. A second drive path formed by engaging a second spur gear or a second internal gear provided on the second non-excitation electromagnetic clutch and a fifth internal gear or a fifth spur gear provided on the rotary shaft is disconnected or connected depending on presence or absence of energization of the second non-excitation electromagnetic clutch. A third drive path formed by engaging a third spur gear or a third internal gear provided on the third non-excitation electromagnetic clutch and a sixth internal gear or a sixth spur gear provided on the left wheel hub is disconnected or connected depending on presence or absence of energization of the third non-excitation electromagnetic clutch. This configuration transmits the rotational force to the wheel on a desired side.

According to the embodiment of the present invention, the handrim provided on each of the left and right sides is one instead of two, so that the operation of changing the handrim at the time of operation is made unnecessary, and therefore, the effect that the usability is very good for the user can be obtained.

The wheelchair according to the embodiment of the present invention can even be used by anyone other than a person with a disability on either the right or left side of the body. That is, the wheelchair according to the embodiment of the present invention is useful when a person who has healthy both hands moves in the wheelchair with an article (smartphone, tableware, umbrella, or the like) in a single hand. It is also useful when playing sports such as tennis or basketball in a wheelchair.

BRIEF DESCRIPTION OF THE DRAWINGS

FIG. 9 is a table showing energization patterns for non-excitation electromagnetic clutches.

DETAILED DESCRIPTION OF THE INVENTION

Figure 1:
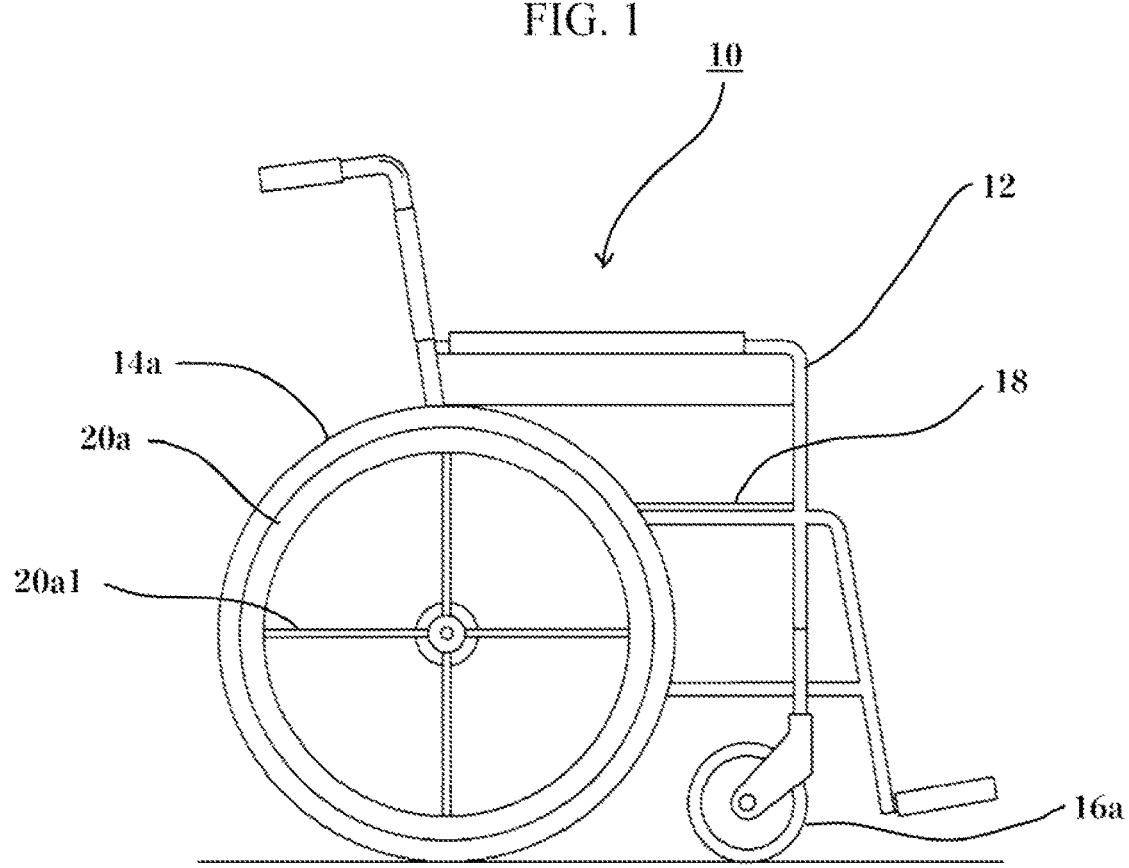
FIG. 1 is a right side view showing a wheelchair according to an embodiment of the present invention.
Figure 2:
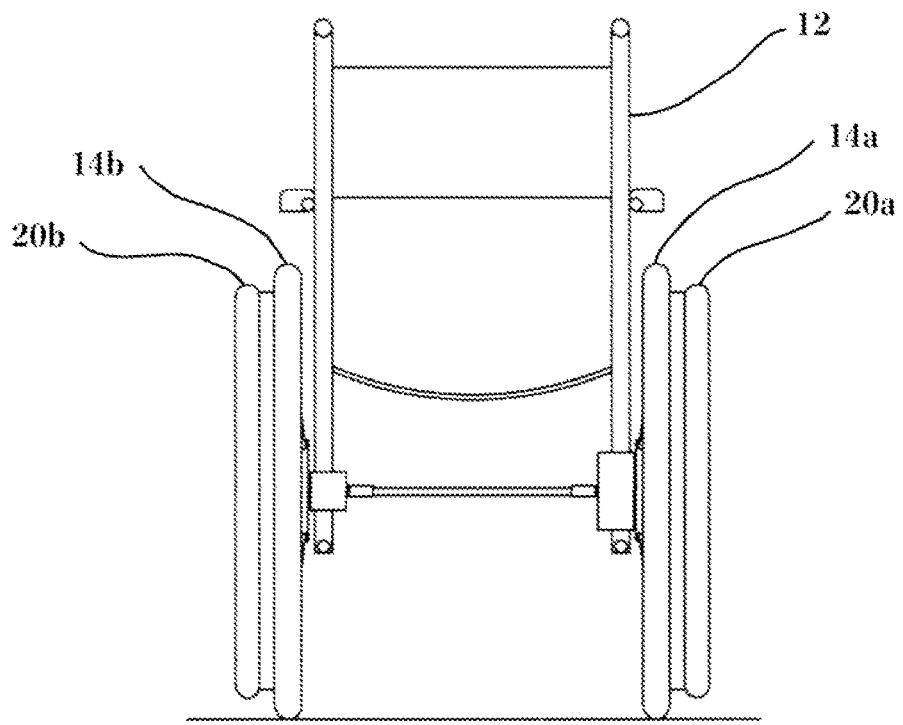
FIG. 2 is a rear view of the wheelchair of FIG. 1.

Next, a wheelchair, according to an embodiment of the present invention, will be described in detail concerning the drawings. FIG. 1 is a right side view showing the wheelchair, according to the embodiment of the present invention. FIG. 2 is a rear view of the wheelchair shown in FIG. 1.

According to the embodiment of the present invention, as shown by a reference numeral 10 as a whole in FIG. 1, the wheelchair has a frame 12 forming a skeleton of the wheelchair, a right wheel 14a and a left wheel 14b, a pair of casters 16a and 16b, and a seat 18.

The wheelchair 10 is, in principle, symmetrical concerning its centerline, and has the same component on each of the right and left sides. In the following description, "a" is attached to the reference symbol of the component located on the right side of the wheelchair 10, and "b" is attached to the reference symbol of the component located on the left side of the wheelchair 10. In the present specification, the "inward" means the side on which the user sitting in the wheelchair is located, and the "outward" means the side opposite to the side on which the user is located.

The wheelchair 10 also includes a handrim 20a disposed concentrically with an axle 24a of the right wheel 14a and outside the right wheel 14a. The handrim 20a is connected to handrim spokes 20a1. Although the four handrim spokes 20a1 are shown in FIG. 1, the number of handrim spokes 20a1 is not limited to this.

The wheelchair 10 uses non-excitation electromagnetic clutches as a drive mechanism. Since non-excitation means that it works when not energized, the non-excitation clutch means that it connects when not energized. Conversely, excitation means that it works when energized.

Figure 3:
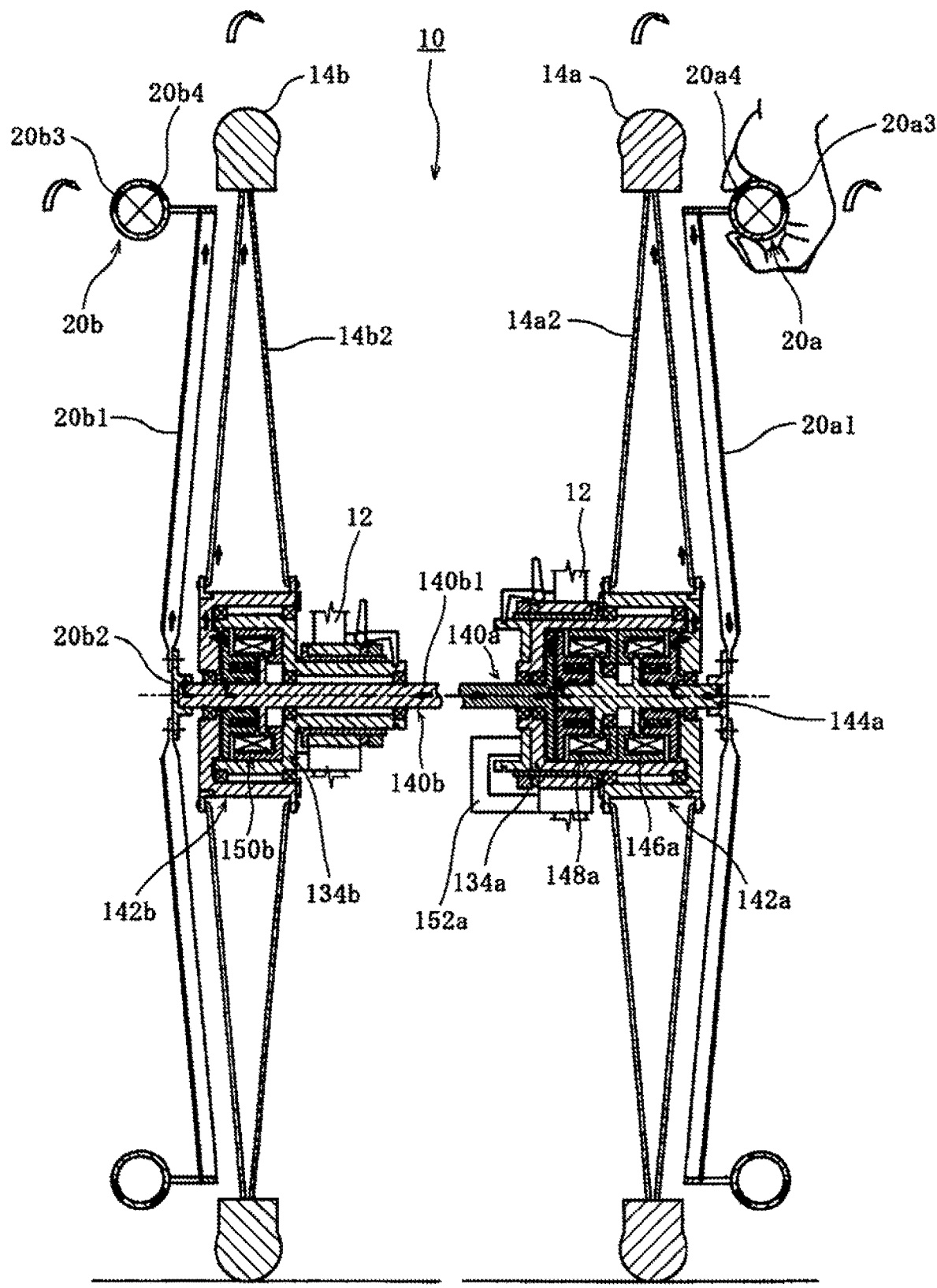
FIG. 3 is a view showing a configuration of a drive mechanism of the wheelchair of FIG. 1.
Figure 4A:
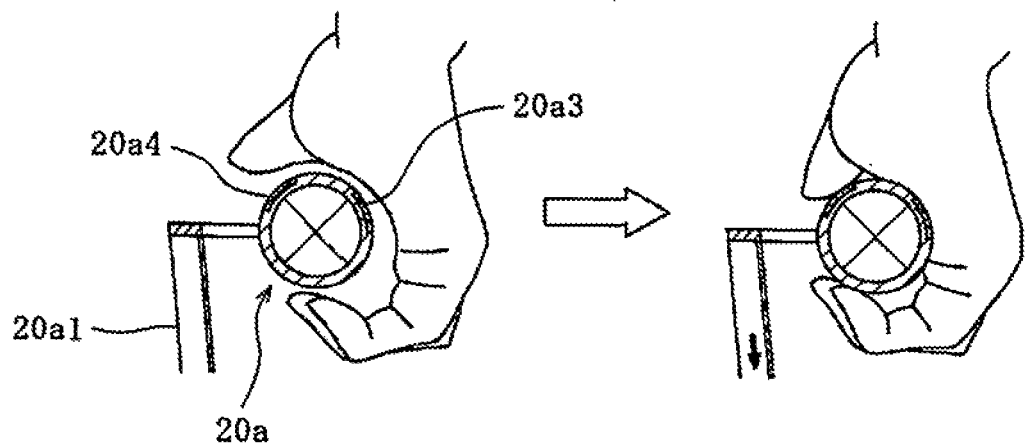
FIG. 4A is a view showing a state in which a right handrim is grasped by a right hand when a first sensor and a second sensor are touched at the same time.
Figure 4B:
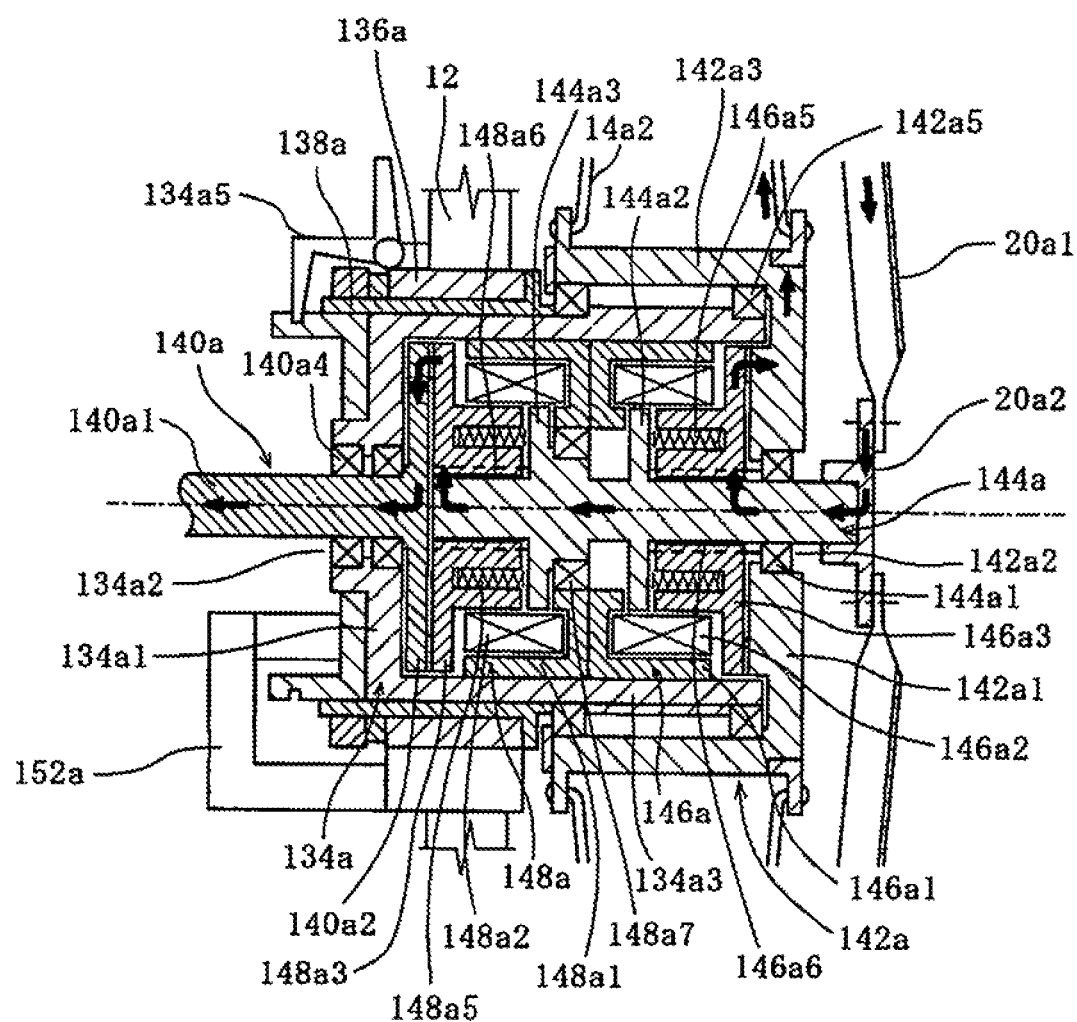
FIG. 4B is an enlarged cross-sectional view of the drive mechanism of a right side portion when the first sensor and the second sensor are touched at the same time.
Figure 5A:
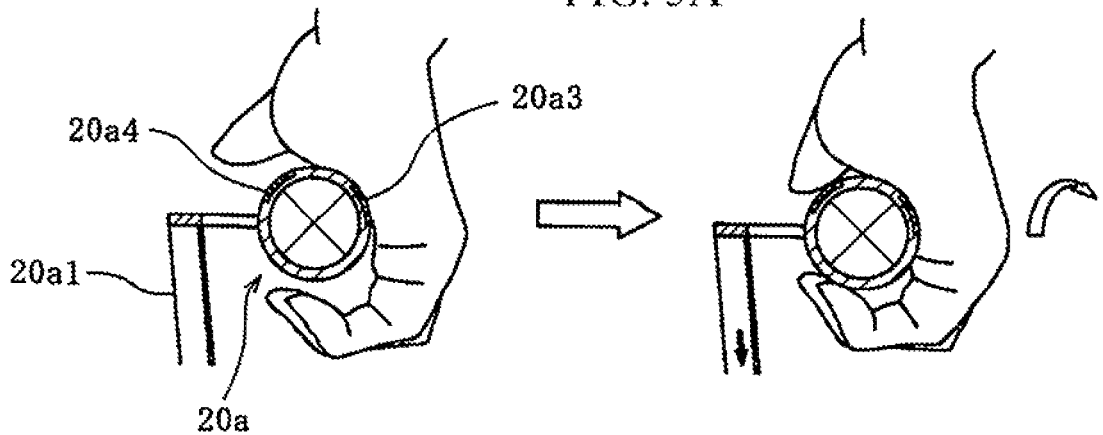
FIG. 5A is a view showing a state in which the right handrim is grasped by the right hand when the first sensor and the second sensor are touched in this order.
Figure 5B:
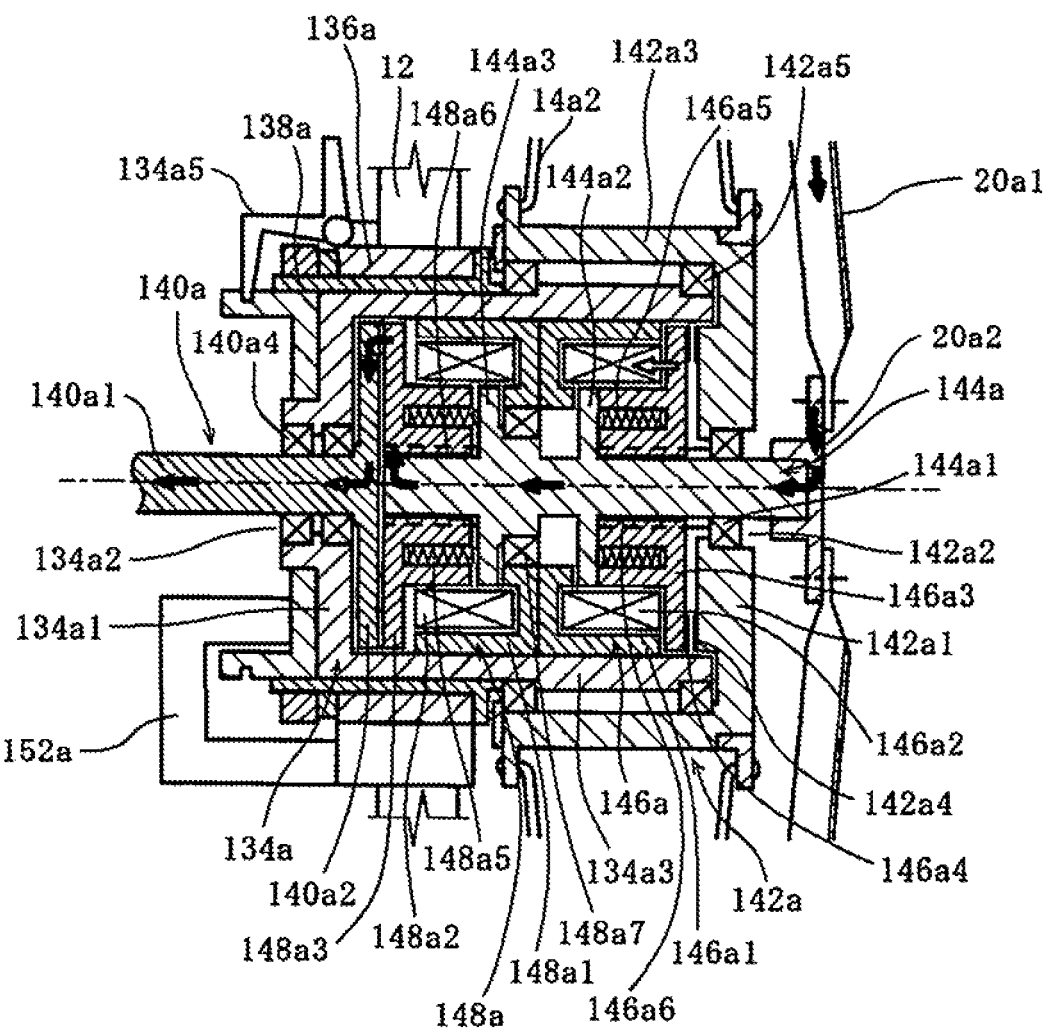
FIG. 5B is the enlarged cross-sectional view of the drive mechanism of the right side portion when the first sensor and the second sensor are touched in this order.
Figure 6A:
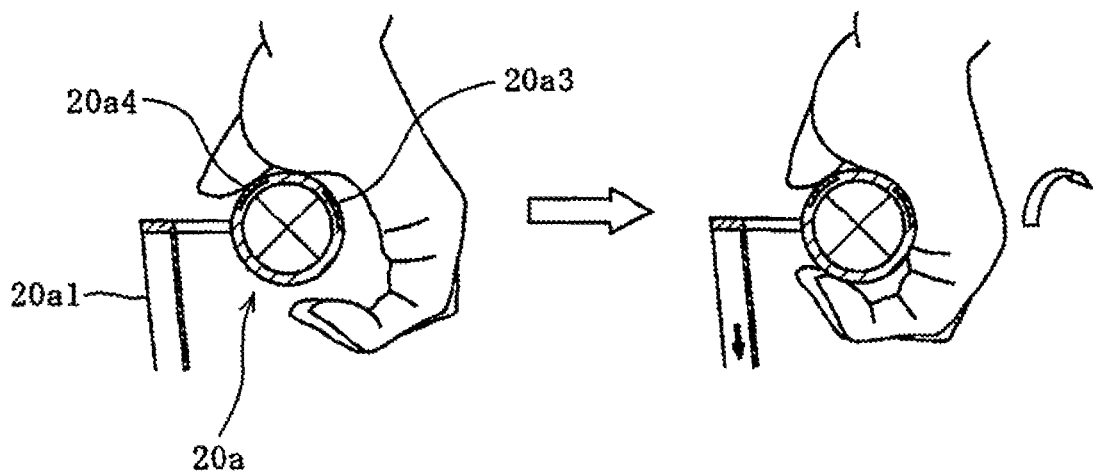
FIG. 6A is a view showing a state in which the right handrim is grasped by the right hand when the second sensor and the first sensor are touched in this order.
Figure 6B:
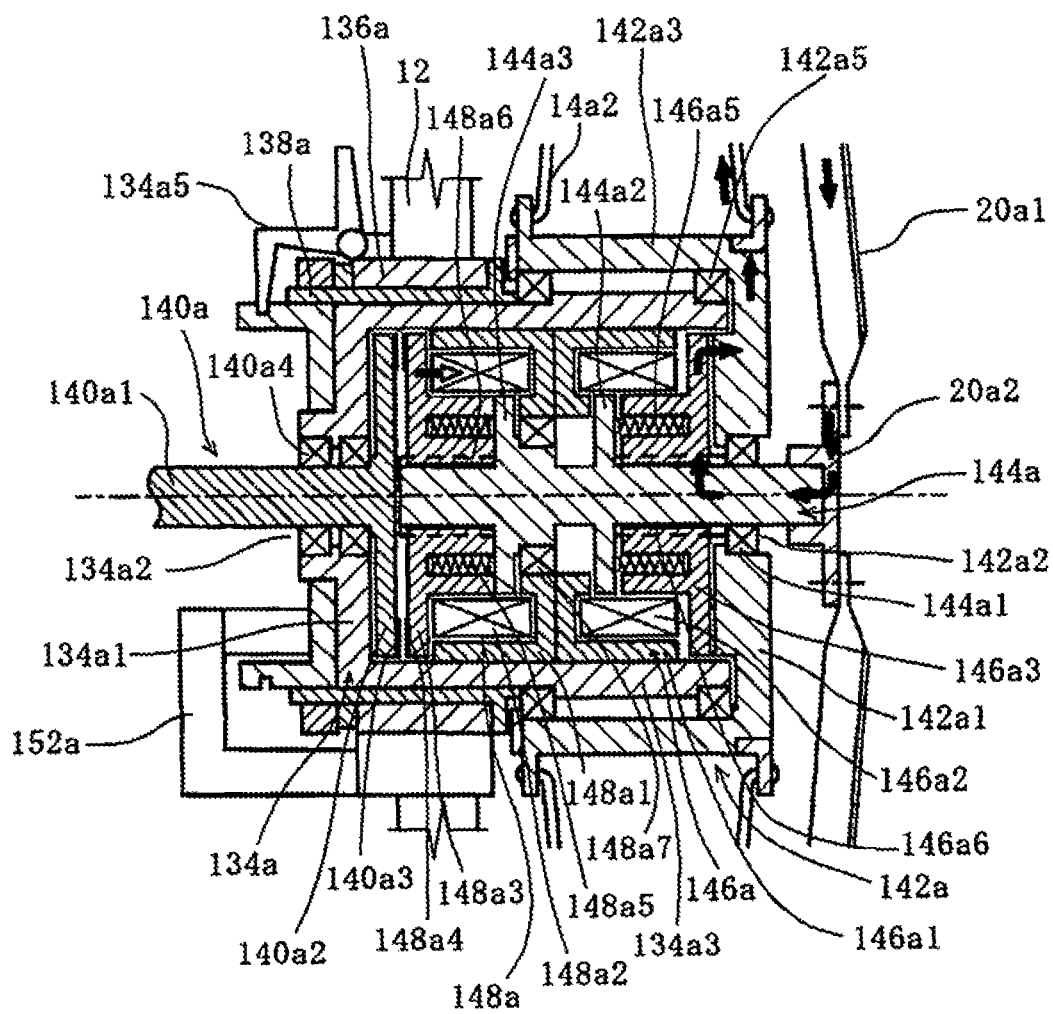
FIG. 6B is the enlarged cross-sectional view of the drive mechanism of the right side portion when the second sensor and the first sensor are touched in this order.
Figure 7A:
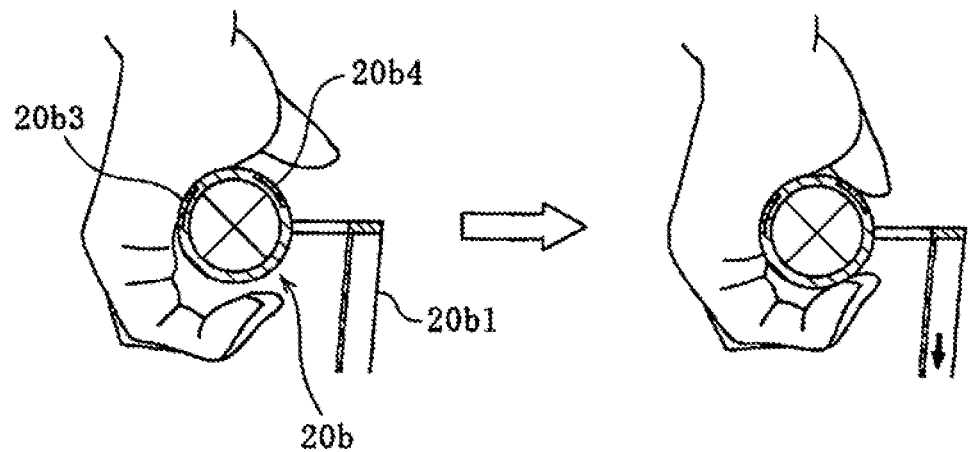
FIG. 7A is a view showing a state in which the left handrim is grasped by a left hand when a third sensor and a fourth sensor are touched in this order.
Figure 7B:
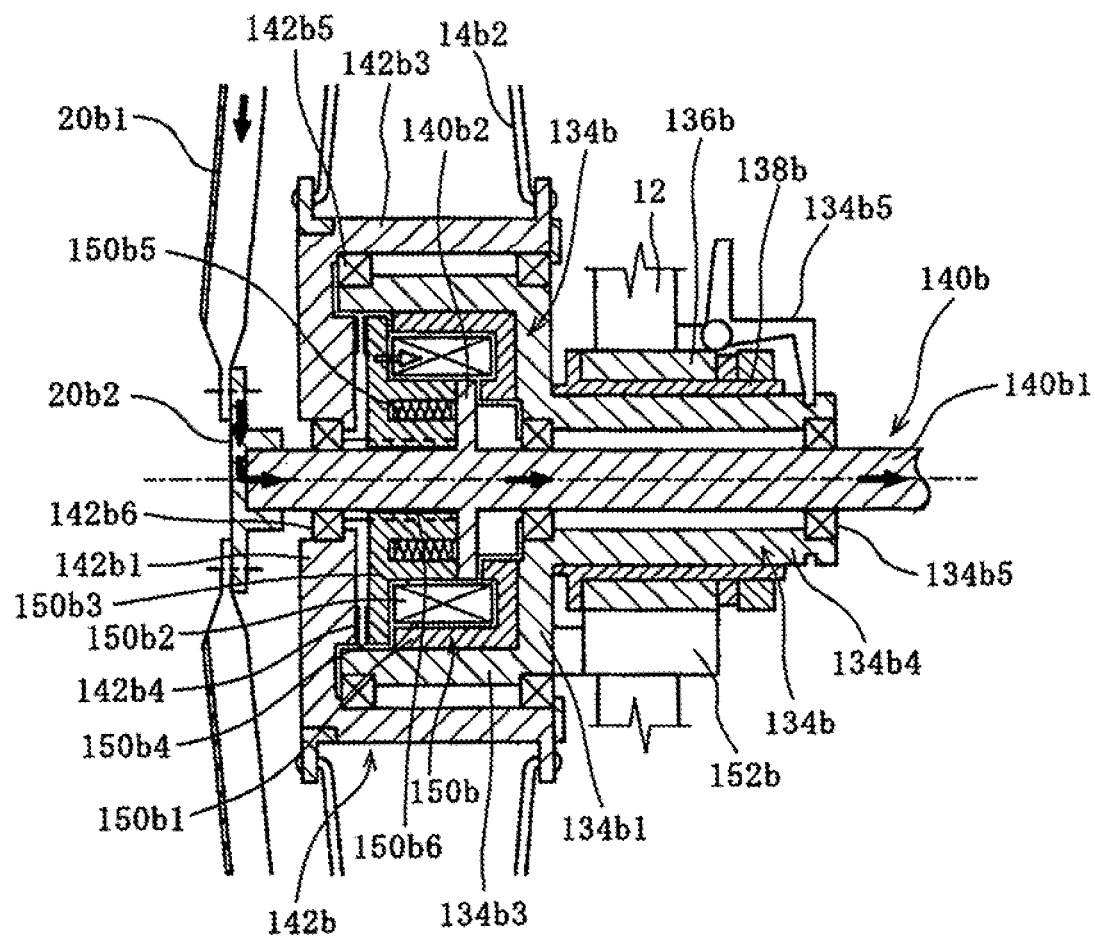
FIG. 7B is an enlarged cross-sectional view of the drive mechanism of a left side portion when the third sensor and the fourth sensor are touched in this order.
Figure 8A:
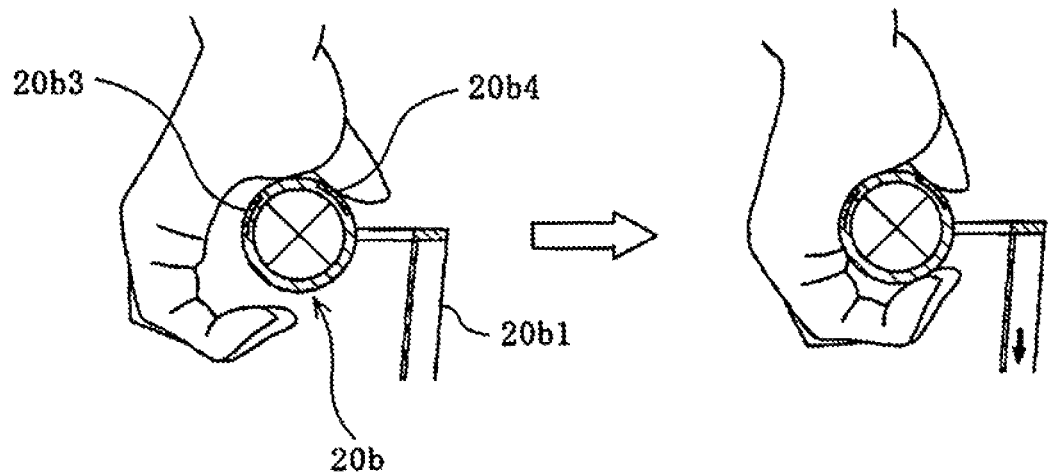
FIG. 8A is a view showing a state in which the left handrim is grasped by the left hand when the fourth sensor and the third sensor are touched in this order.
Figure 8B:
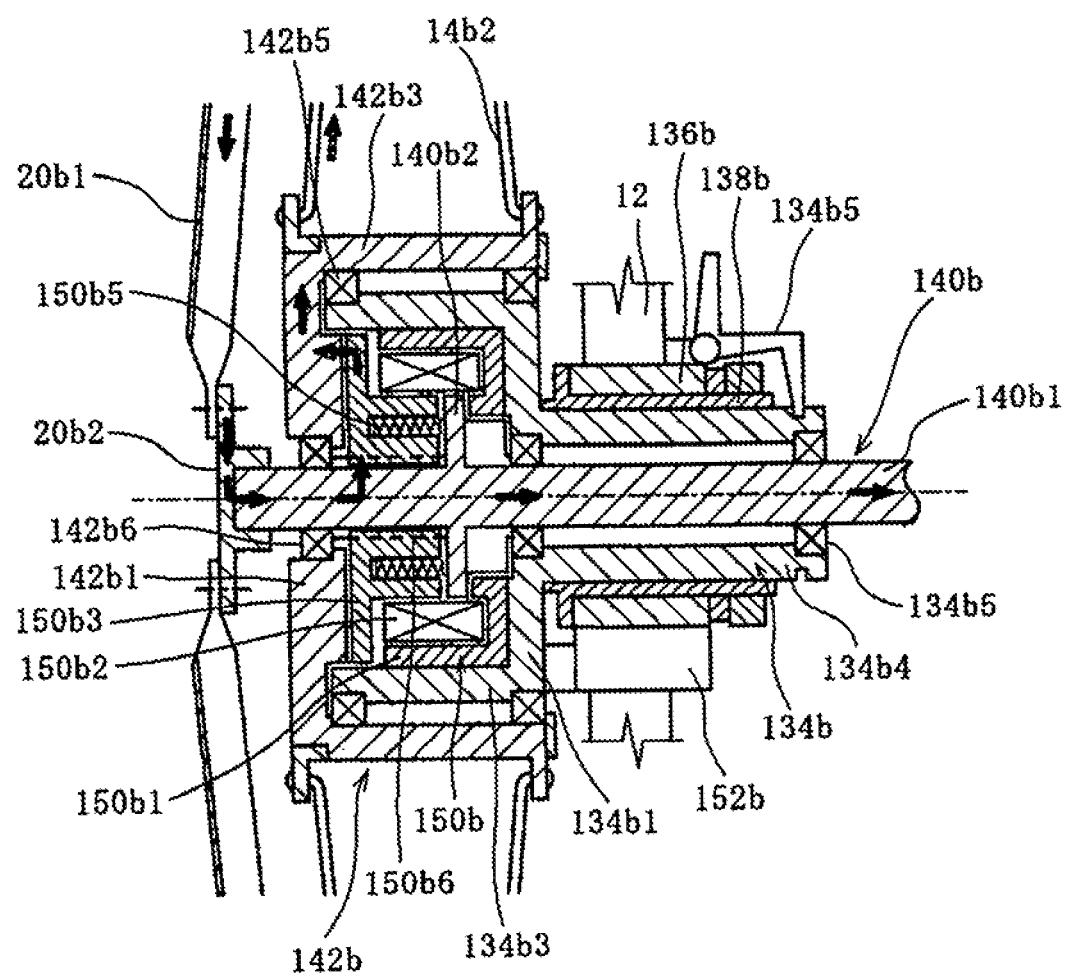
FIG. 8B is the enlarged cross-sectional view of the drive mechanism of the left side portion when the fourth sensor and the third sensor are touched in this order.
Figure 10A:
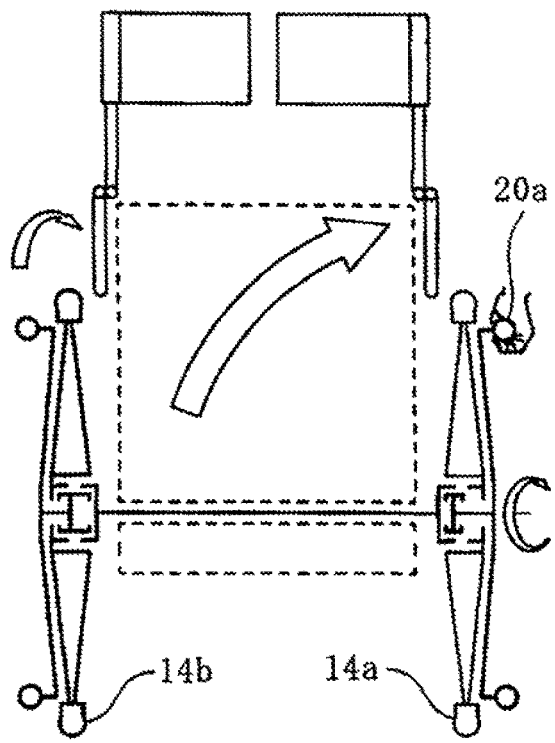
FIGS. 10A, 10B, 10C, and 10D are schematic views for explanation of the operating state of the wheelchair.
Figure 10B:
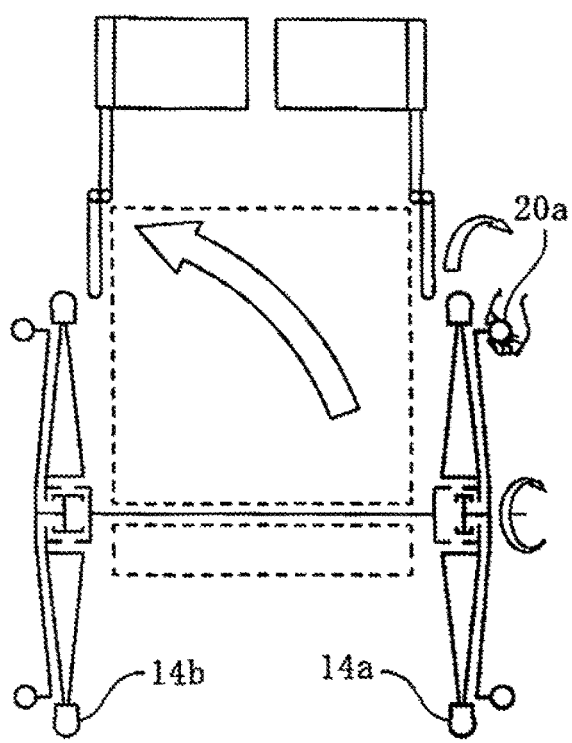
Figure 10C:
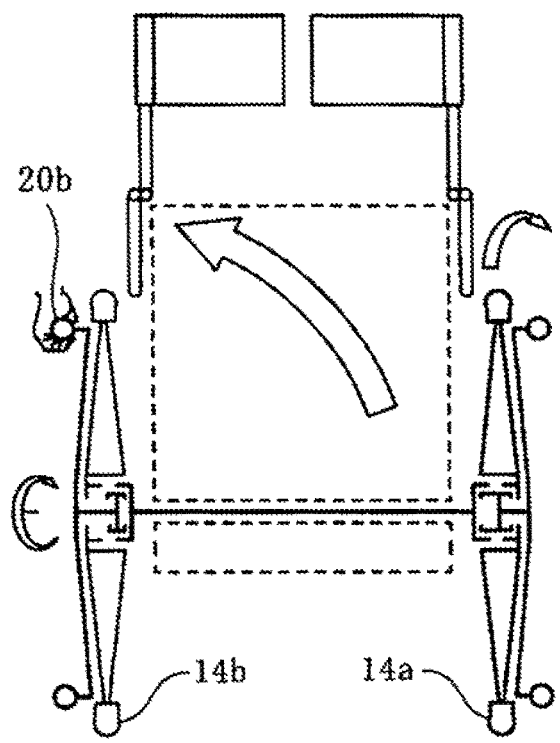
Figure 10D:
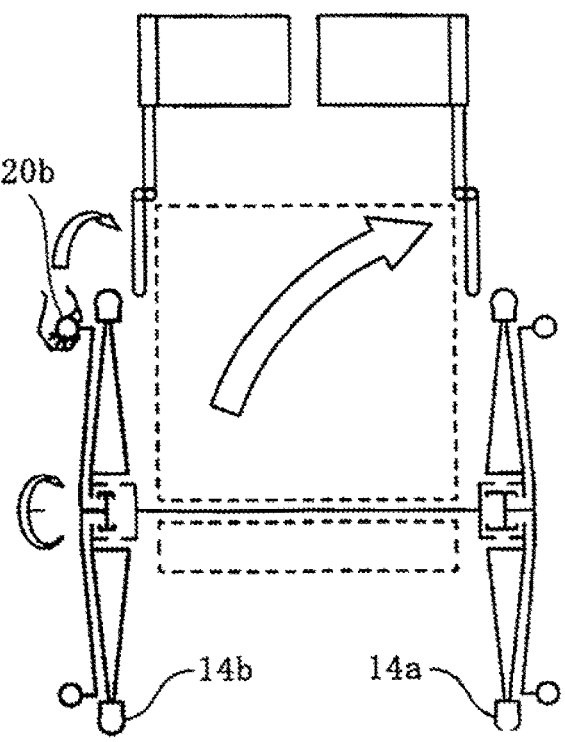

FIG. 3 is a view showing the drive mechanism of the wheelchair 10. FIGS. 4A and 4B are views showing the drive mechanism of the right side portion when a first sensor 20a3 and a second sensor 20a4 are touched at the same time. FIGS. 5A and 5B are views showing the drive mechanism of the right side portion when the first sensor 20a3 and the second sensor 20a4 are touched in this order. FIGS. 6A and 6B are views showing the drive mechanism of the right side portion when the second sensor 20a4 and the first sensor 20a3 are touched in this order. FIGS. 7A and 7B are views showing the drive mechanism on the left side when the third sensor 20b3 and the fourth sensor 20b4 are touched in this order. FIGS. 8A and 8B are views showing the drive mechanism on the left side when the fourth sensor 20b4 and the third sensor 20b3 are touched in this order.

The wheelchair 10 is provided with the axle 134a supporting the right wheel 14a. The axle 134a has a circular disk portion 134a1 having an opening 134a2 at the center, and a cylindrical portion 134a3 fixed to the outside of the disk portion 134a1 to be concentric with the disk portion 134a1. The cylindrical portion 134a3 is mounted to the frame 12 via a mounting boss 136a and a mounting sleeve 138a. Reference numeral 134a5 is a known axle fixing spring-loaded lever member used for fixing the axle 134 a.

A rotation shaft 140a is rotatably disposed in the opening 134a2 of the disk portion 134a1 of the axle 134a. A rotary shaft 140a has a columnar shaft portion 140a1, and a disk-shaped disk portion 140a2 provided at the outer end of the shaft portion 140a1 and located in the cylindrical portion 134a3 of the axle 134a. A fifth engagement portion 140a3 (see FIG. 6B) is provided on the outer periphery of the disk portion 140a2. The shaft portion 140a1 is rotatably supported by a bearing 140a4.

A wheel hub 142a is rotatably supported by the axle 134a. The wheel hub 142a has a circular disk portion 142a1 having an opening 142a2 in the center, and a cylindrical portion 142a3 extending inward on the outer periphery of the disk portion 142a1 and fixed to be concentric with the disk portion 142a1. A fourth engagement portion 142a4 (see FIG. 5B) is provided on the inner surface of the disk portion 142a1. The cylindrical portion 142a3 is rotatably supported by the cylindrical portion 134a3 of the axle 134a by a bearing 142a5. Further, the wheel spokes 14a2 of the right wheel 14a are connected to the outer periphery of the wheel hub 142a.

The wheelchair 10 also includes a movable shaft member 144a, which is a columnar spline shaft as a whole, and the movable shaft member 144a is rotatably supported by a bearing 144a1 provided in the opening 142a2 of the wheel hub 142a. A first spring receiving portion 144a2 is provided on the outer side of the central portion of the movable shaft member 144a, and a second spring receiving portion 144a3 is provided on the inner side of the central portion. A handrim spoke receiving member 20a2 is fixed to the outer end of the movable shaft member 144a, and the handrim spoke receiving member 20a2 is connected to the handrim spoke 20a1.

The wheelchair 10 also includes a first non-excitation electromagnetic clutch 146a disposed outwardly within the cylindrical portion 134a3 of the axle 134a. The first non-excitation electromagnetic clutch 146a includes a substantially cylindrical yoke 146a1 containing a coil 146a2, a substantially disk-shaped armature 146a3 disposed at a position facing the coil 146a2, a first engagement portion 146a4 (see FIG. 5B) provided on a side of the armature 146a3 facing the disk portion 142a1 of the wheel hub 142a, and a spring 146a5 for pressing the armature 146a3 toward the disk portion 142a1 of the wheel hub 142a. The movable shaft member 144a is slidably inserted into a spline hole 146a6 provided at the center of the armature 146a3, and the spring 146a5 is supported by the first spring receiving portion 144a2. In the first non-excitation electromagnetic clutch 146a, the first engagement portion 146a4 of the armature 146a3 engages with the fourth engagement portion 142a4 of the wheel hub 142a by the spring force of the spring 146a5 in the non-energized state. In the energized state, the armature 146a3 is attracted to the yoke 146a1 against the spring force of the spring 146a5 by the magnetic force of the energized coil 146a2, and the engagement between the armature 146a3 and the wheel hub 142a is released.

The wheelchair 10 also includes a second non-excitation electromagnetic clutch 148a disposed inwardly within the cylindrical portion 134a3 of the axle 134a and rotatably supported by the movable shaft member 144a by a bearing 148a7. The second non-excitation electromagnetic clutch 148a includes a substantially cylindrical yoke 148a1 containing a coil 148a2, a substantially disk-shaped armature 148a3 disposed at a position facing the coil 148a2, a second engagement portion 148a4 (see FIG. 6B) provided on a side of the armature 148a3 facing the disk portion 140a2 of the rotation shaft 140a, and a spring 148a5 for pressing the armature 148a3 toward the disk portion 140a2 of the rotary shaft 140a. The movable shaft member 144a is slidably inserted into a spline hole 148a6 provided at the center of the armature 148a3, and the spring 148a5 is supported by the second spring receiving portion 144a3. In the second non-excitation electromagnetic clutch 148a, the second engagement portion 148a4 of the armature 148a3 engages with the fifth engagement portion 140a3 of the rotary shaft 140a by the spring force of the spring 148a5 in the non-energized state. In the energized state, the armature 148a3 is attracted to the yoke 148a1 against the spring force of the spring 148a5 by the magnetic force of the energized coil 148a2, and the engagement between the armature 148a3 and the rotation shaft 140a is released.

In the above description, the right side portion of the wheelchair 10 has been described, but the left side portion is substantially the same as the right side portion except for the following three differences. These differences will be described in FIG. 3, FIG. 6B, FIG. 7B, and FIG. 8B.

As a first difference, the right portion of the wheelchair 10 is equipped with the two non-excitation electromagnetic clutches (the first non-excitation electromagnetic clutch 146a and the second non-excitation electromagnetic clutch 148a), while the left portion of the wheelchair 10 is equipped with only one non-excitation electromagnetic clutch (a third non-excitation electromagnetic clutch 150b). Since only the third non-excitation electromagnetic clutch 150b is provided on the left side portion of the wheelchair 10, an inner cylindrical portion 134b4 is provided which is fixed to be concentric with a disk portion 134b1 inward the disk portion 134b1 of an axle 134b to support a rotation shaft 140b (see FIG. 3, FIG. 7B, and FIG. 8B).

As a second difference, as shown in FIG. 6B, FIG. 7B, and FIG. 8B, the rotation shaft 140b is also provided in the left side portion of the wheelchair 10, but unlike the rotation shaft 140a having the shaft portion 140a1 and the disk portion 140a2, the rotation shaft 140b has only shaft portion 140b1 and does not have a disk portion. That is, in the left portion, the rotation shaft 140b is rotatably supported by a bearing 142b6 of a wheel hub 142b and a bearing 134b5 of the inner cylindrical portion 134b4. A spring receiving portion 140b2 is provided at a center portion of the rotation shaft 140b. A handrim spoke receiving member 20b2 is fixed to the outer end of the rotating shaft 140b, and a handrim spoke 20b1 is connected to the handrim spoke receiving member 20b2. The shaft portion 140b1 of the rotation shaft 140b is connected to the shaft portion 140a1 of the rotation shaft 140a via a connecting sleeve (not shown), to form a single rotation shaft.

As a third difference, a component corresponding to the movable shaft member 144a provided in the right side portion is not provided in the left side portion.

The third non-excitation electromagnetic clutch 150b has a configuration that is line symmetrical with the first non-excitation electromagnetic clutch 146a concerning the centerline of the wheelchair 10. That is, the third non-excitation electromagnetic clutch 150b includes a substantially cylindrical yoke 150b1 containing a coil 150b2, a substantially disk-shaped armature 150b3 disposed at a position facing the coil 150b2, a third engagement portion 150b4 provided on a side of the armature 150b3 facing a disk portion 142b1 of the wheel hub 142b, and a spring 150b5 for pressing the armature 150b3 toward the disk portion 142b1 of the wheel hub 142b. The shaft portion 140b1 of the rotary shaft 140b is slidably inserted into a spline hole 150b6 provided at the center of the armature 150b3, and the spring 150b5 is supported by the third spring receiving portion 140b2. In the third non-excitation electromagnetic clutch 150b, the third engagement portion 150b4 of the armature 150b3 engages with a sixth engagement portion 142b4 of the wheel hub 142b by the spring force of the spring 150b5 in the non-energized state. In the energized state, the armature 150b3 is attracted to the yoke 150b1 against the spring force of the spring 150b5 by the magnetic force of the energized coil 150b2, and the engagement between the armature 150b3 and the wheel hub 142b is released.

The first engagement portion 146a4 and the fourth engagement portion 142a4, the second engagement portion 148a4 and the fifth engagement portion 140a3, and the third engagement portion 150b4 and the sixth engagement portion 142b4, which are in surface contact with each other, are made of a material having a high coefficient of friction (for example, rubber), or are made of a material having a high friction coating, or are formed of a tooth surface having a complementary shape to each other.

The first non-excitation electromagnetic clutch 146a is a device for transmitting a force to the right wheel 14a, the second non-excitation electromagnetic clutch 148a is a device for transmitting a force to the left wheel 14b or the right wheel 14a, and the third non-excitation electromagnetic clutch 150b is a device for transmitting a force to the left wheel 14b. These non-excitation electromagnetic clutches 146a, 148a, and 150b are themselves known devices. Reference numerals 152a and 152b are known electrical connectors for energizing the coils.

The wheelchair 10 further includes the first sensor 20a3 and the second sensor 20a4 disposed on the outer surface of the right handrim 20a, the third sensor 20b3 and the fourth sensor 20b4 disposed on the outer surface of the left handrim 20b, a sensor signal transmitter (not shown) disposed inside each of the handrims 20a and 20b, and a control unit (not shown) disposed at a predetermined position. Each of the sensors 20a3, 20a4, 20b3, and 20b4 is connected to each of the sensor signal transmitters by wiring, and each of the sensor signal transmitters is connected to the control unit by wireless.

Energization or non-energization to the non-excitation electromagnetic clutches 146a, 148a, and 150b is performed by touch or non-touch of a palm and a thumb to the sensors 20a3, 20a4, 20b3, and 20b4 disposed on the handrims 20a and 20b. That is when the palm and the thumb touch a certain sensor, a signal is sent to the sensor signal transmitting unit and then to the control device, and the non-excitation electromagnetic clutches 146a, 148a, and 150b are energized according to the sent signal. The two sensors 20a3 and 20a4 are disposed on the right handrim 20a. Therefore, by combining the order of touch of the palm and the thumb to the sensors 20a3 and 20a4, the energization patterns for the non-excitation electromagnetic clutches 146a, 148a, and 150b can be set in three ways. Similarly, the two sensors 20b3 and 20b4 are disposed on the left handrim 20b. Therefore, by combining the order of touch of the palm and the thumb to the sensors 20b3 and 20b4, the energization patterns for the non-excitation electromagnetic clutches 146a, 148a, and 150b can be set in three ways. FIG. 9 shows an example of the energization patterns.

A specific description will be given based on the energization patterns shown in FIG. 9. First, the operation of the user's right hand will be described. When the user's palm and thumb touch both the first sensor 20a3 and the second sensor 20a4 at the same time, all the coils are not energized. A first drive path formed by engaging the first engagement portion provided on the first non-excitation electromagnetic clutch and the fourth engagement portion provided on the right wheel hub remains connected. When the user's palm and thumb touch the first sensor 20a3 and the second sensor 20a4 in this order, only the first non-excitation electromagnetic clutch 146a is energized. The first drive path is disconnected. When the user's thumb and palm touch the second sensor 20a4 and the first sensor 20a3 in this order, only the second non-excitation electromagnetic clutch 148a is energized. A second drive path formed by engaging the second engagement portion provided on the second non-excitation electromagnetic clutch and the fifth engagement portion provided on the rotary shaft is disconnected. Next, the operation of the user's left hand will be described. When the user's palm and thumb touch both the third sensor 20b3 and the fourth sensor 20b4 at the same time, all the coils are not energized. A third drive path formed by engaging the third engagement portion provided on the third non-excitation electromagnetic clutch and the sixth engagement portion provided on the left wheel hub remains connected. When the user's palm and thumb touch the third sensor 20b3 and the fourth sensor 20b4 in this order, only the third non-excitation electromagnetic clutch 150b is energized. The third drive path is disconnected. When the user's thumb and palm touch the fourth sensor 20b4 and the third sensor 20b3 in this order, only the second non-excitation electromagnetic clutch 148a is energized. The second drive path is disconnected. Further, the operation of the user's both hands will be described. When the user's palm and thumb touch the first sensor 20a3 and/or the second sensor 20a4 and the third sensor 20b3 and/or the fourth sensor 20b4 at the same time, only the second non-excitation electromagnetic clutch 148a is energized. The second drive path is disconnected.

Figures 11A, 11B:
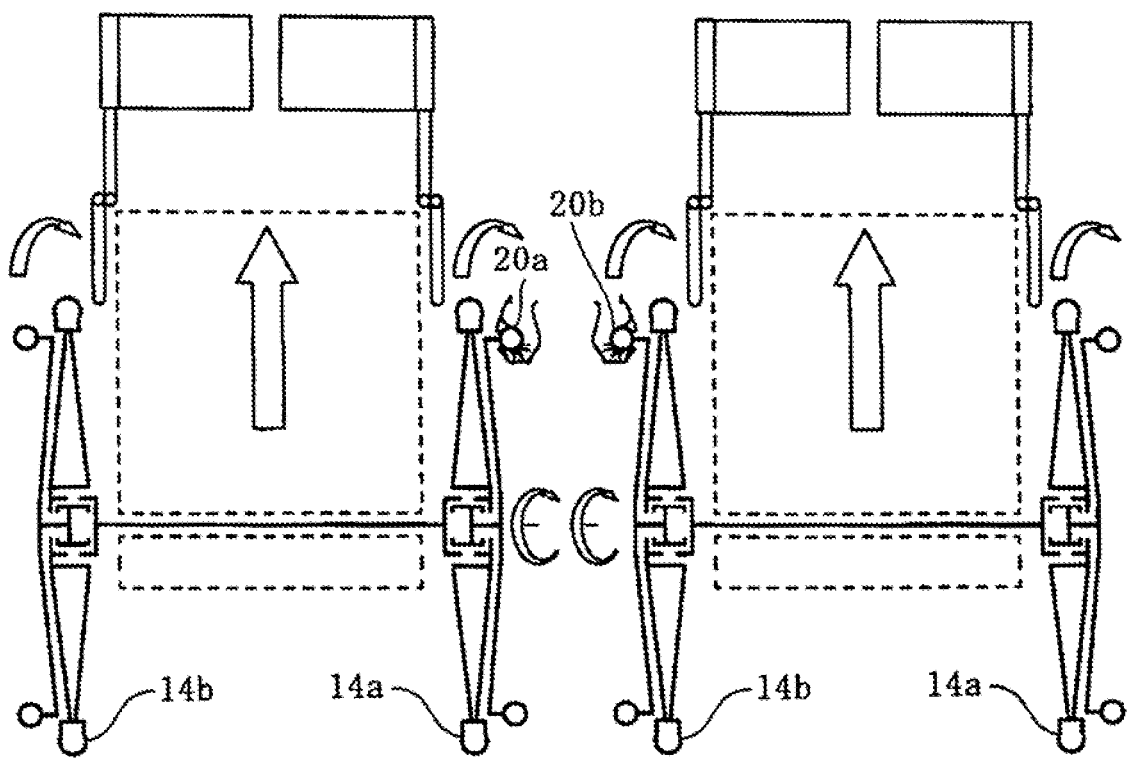
FIGS. 11A, 11B, and 11C are other schematic views for explanation of the operating state of the wheelchair.
Figure 11C:
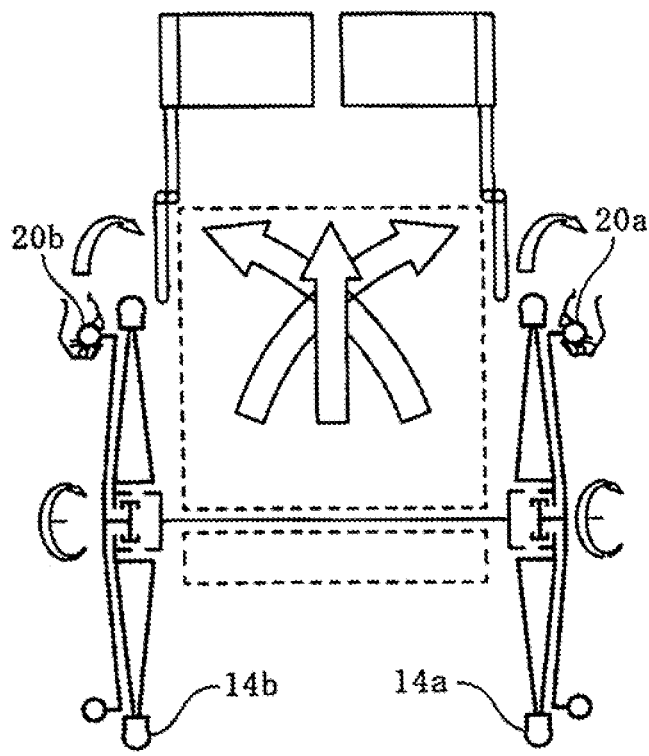

The operation of the wheelchair 10 will be described concerning FIGS. 10A to 10D and FIGS. 11A to 11C. FIGS. 10A to 10D are schematic plan views showing the right-turn movement, or the left turn movement of the wheelchair 10, FIGS. 11A and 11B are schematic plan views showing the forward movement of the wheelchair 10, and FIG. 11C is a schematic plan view showing the forward movement, the right-turn movement, or the left turn movement of the wheelchair 10.

First, the forward movement of the wheelchair 10 will be described. When attempting to move forward by the right hand, both the first sensor 20a3 and the second sensor 20a4 are touched at the same time (see FIG. 4A). The first non-excitation electromagnetic clutch 146a, the second non-excitation electromagnetic clutch 148a, and the third non-excitation electromagnetic clutch 150b are not energized. The first engagement portion 146a4 and the fourth engagement portion 142a4 remain engaged, the second engagement portion 148a4 and the fifth engagement portion 140a3 remain engaged, and the third engagement portion 150b4 and the sixth engagement portion 142b4 remain engaged. The first drive path, the second drive path, and the third drive path remain connected respectively. When the handrim 20a is rotated forward in this state, the rotational force of the handrim 20a causes the transmission to the right wheel 14a via the movable shaft member 144a, the armature 146a3, the wheel hub 142a, and the wheel spokes 14a2 (see FIG. 4B). At the same time, the rotational force of the handrim 20a causes the transmission to the right wheel 14b via the movable shaft member 144a, the armature 148a3, the rotary shaft 140a, the rotary shaft 140b, the armature 150b3, the wheel hub 142a, and the wheel spokes 14a2 (see FIG. 4B and FIG. 8B). As a result, the wheelchair 10 moves forward (see FIG. 11A). Next, the right-turn or left-turn movement of the wheelchair 10 will be described. When attempting to turn right by the right hand, the first sensor 20a3 is touched, and then the second sensor 20a4 is touched (see FIG. 5A). Since only the first non-excitation electromagnetic clutch 146a is energized, the first engagement portion 146a4 and the fourth engagement portion 142a4 are disengaged. The first drive path is disconnected. The second engagement portion 148a4 and the fifth engagement portion 140a3 remain engaged (see FIG. 5B). The third engagement portion 150b4 and the sixth engagement portion 142b4 remain engaged (see FIG. 8B). The second drive path and the third drive path remain connected respectively. When the handrim 20a is rotated forward in this state, the rotational force of the handrim 20a causes the transmission to the left wheel 14b via the movable shaft member 144a, the armature 148a3, the rotary shaft 140a, the rotary shaft 140b, the armature 150b3, the wheel hub 142b, and the wheel spoke 14b2 (see FIG. 5B and FIG. 8B). The left wheel 14b rotates in a state in which the right wheel 14a does not rotate. As a result, the wheelchair 10 turns right (see FIG. 10A). When attempting to turn left by the right hand, the second sensor 20a4 is touched, and then the first sensor 20a3 is touched (see FIG. 6A). Since only the second non-excitation electromagnetic clutch 148a is energized, the fifth engagement portion 140a3 and the second engagement portion 148a4 are disengaged (see FIG. 6 B). The second drive path is disconnected. The first engagement portion 146a4 and the fourth engagement portion 142a4 remain engaged. The first drive path is connected. When the handrim 20a is rotated forward in this state, the rotational force of the handrim 20a causes the transmission to the right wheel 14a via the movable shaft member 144a, the armature 146a3, the wheel hub 142a, and the wheel spokes 14a2 (see FIG. 6 B). The right wheel 14a rotates in a state in which the left wheel 14b does not rotate. As a result, the wheelchair 10 to turn left (see FIG. 10B).

On the other hand, when attempting to move forward by the left hand, both the third sensor 20b3 and the fourth sensor 20b4 are touched at the same time. The third non-excitation electromagnetic clutch 150b, the second non-excitation electromagnetic clutch 148a, and the first non-excitation electromagnetic clutch 148a are not energized. The third engagement portion 150b4 and the sixth engagement portion 142b4 remain engaged, the fifth engagement portion 140a3 and the second engagement portion 148a4 remain engaged, and the first engagement portion 146a4 and the fourth engagement portion 142a4 remain engaged. The third drive path, the second drive path, and the first drive path remain connected respectively. When the handrim 20b is rotated forward in this state, the rotational force of the handrim 20b causes the transmission to the left wheel 14b via the rotary shaft 140b, an armature 150b3, the wheel hub 142b, and the wheel spokes 14b2 (see FIG. 8B). At the same time, the rotational force of the handrim 20b causes the transmission to the right wheel 14a via the rotary shaft 140b, the rotary shaft 140a, the armature 148a3, the movable shaft member 144a, the armature 146a3, the wheel hub 142a, and the wheel spokes 14a2 (see FIG. 8B and FIG. 4B). As a result, the wheelchair 10 moves forward (see FIG. 11B). When attempting to turn left by the left hand, the third sensor 20b3 is touched, and then the fourth sensor 20b4 is touched (see FIG. 7A). Since only the third non-excitation electromagnetic clutch 150b is energized, the third engagement portion 150b4 and the sixth engagement portion 142b4 are disengaged (see FIG. 7B). The third drive path is disconnected. The fifth engagement portion 140a3 and the second engagement portion 148a4 remain engaged, and the first engagement portion 146a4 and the fourth engagement portion 142a4 remain engaged (see FIG. 4B). The second drive and the first drive path remain connected respectively. When the handrim 20b is rotated forward in this state, the rotational force of the handrim 20b causes the transmission to the right wheel 14a via the rotary shaft 140b, the rotary shaft 140a, the armature 148a3, the movable shaft member 144a, the armature 146a3, the wheel hub 142a, and the wheel spokes 14a2 (see FIG. 7B and FIG. 4B). The right wheel 14a rotates in a state in which the left wheel 14b does not rotate. As a result, the wheelchair 10 turns left (see FIG. 10C). When attempting to turn right by the left hand, the fourth sensor 20b4 is touched, and then the third sensor 20b3 is touched (see FIG. 8A). Since only the second non-excitation electromagnetic clutch 148a is energized, the fifth engagement portion 140a3 and the second engagement portion 148a4 are disengaged (see FIG. 8B). The second drive path is disconnected. The third engagement portion 150b4 and the sixth engagement portion 142b4 remain engaged. The third drive path is connected. When the handrim 20b is rotated forward in this state, the rotational force of the handrim 20b causes the transmission to the left wheel 14b via the rotary shaft 140b, the armature 150b3, the wheel hub 142b, and the wheel spoke 14b2 (see FIG. 8B). The left wheel 14b rotates in a state in which the right wheel 14a does not rotate. As a result, the wheelchair 10 turns right (see FIG. 10D).

When the handrim 20a is grasped by the right hand and the handrim 20b is grasped by the left hand at substantially the same time, only the second non-excitation electromagnetic clutch 148a is energized regardless of the order in which the sensors are touched. The second engagement portion 148a4 and the fifth engagement portion 140a3 are disengaged. The second drive path is disconnected. If the handrim 20a is rotated forward in this state, the right wheel 14a is rotated. Further, when the handrim 20b is rotated forward, the left wheel 14b is rotated. As a result, the wheelchair 10 can freely move forward, or turn right and left (see FIG. 11C).

The energization patterns shown in FIG. 9 is only an example, and other energization patterns may be set.

The wheelchair 10 is configured such that the rotational force is transmitted by the first engagement portion 146a4 and the fourth engagement portion 142a4, the second engagement portion 148a4 and the fifth engagement portion 140a3, and the third engagement portion 150b4 and the sixth engagement portion 142b4, which are surface contact with each other. The wheelchair 10 may be configured such that the rotational force is transmitted by engaging between a spur gear and an internal gear. The spur gear and the internal gear are concentric and have the same pitch diameter and number of gear teeth. In this case, the first engagement portion and the fourth engagement portion may be replaced with the first spur gear or the first internal gear and the fourth internal gear or the fourth spur gear, the second engagement portion and the fifth engagement portion may be replaced with the second spur gear or the second internal gear and the fifth internal gear or the fifth spur gear, and the third engagement portion and the sixth engagement portion may be replaced with the third spur gear or the third internal gear and the sixth internal gear or the sixth spur gear. Further, the second non-excitation electromagnetic clutch 148a may be provided on the left side portion of the wheelchair 10 instead of the right side portion.

It is needless to say that the present invention is not limited to the above-described embodiments, various modifications can be made within the scope of the invention described in the claims, and these are also included in the scope of the present invention.

For example, the details of the components of the wheelchair shown are merely exemplary and these details may be modified.

DESCRIPTION OF REFERENCE NUMERALS 10 wheelchair
12 frame
14a, 14b wheel
14a1, 14b1 wheel cover
14a2, 14b2 wheel spoke
16a, 16b caster
18 sheet
20a, 20b handrim
20a1, 20b1 handrim spoke
20a2, 20b2 handrim spoke receiving member
134a, 134b axle
136a, 136b mounting boss
138a, 138b mounting sleeve
140a, 140b rotary shaft
142a, 142b wheel hub
144a movable shaft member
146a first non-excitation electromagnetic clutch
148a second non-excitation electromagnetic clutch
150b third non-excitation electromagnetic clutch
152a, 150b electrical connector

What is claimed is:

1. A wheelchair having a frame, a right wheel and a left wheel, a right caster and a left caster, and a seat, the wheelchair comprising:
a right-left pair of handrims concentrically disposed with an axle of each wheel and respectively connected to handrim spokes;
a rotary shaft for transmitting a rotational force generated by a rotation of the handrim on one side to a wheel on the opposite side via a drive mechanism; and
a pair of wheel hubs for transmitting the rotational force generated by the rotation of the handrim on the one side to the wheel on the same side via the drive mechanism, wherein
the drive mechanism includes two pairs of right and left sensors respectively disposed on the outer surface of each of the handrims, a first non-excitation electromagnetic clutch disposed on the right side of the wheelchair for transmitting the rotational force to the right wheel, a second non-excitation electromagnetic clutch disposed on the right side or the left side of the wheelchair for transmitting the rotational force to the wheel on the opposite side, and a third non-excitation electromagnetic clutch disposed on the left side of the wheelchair for transmitting the rotational force to the left wheel,
energization of the non-excitation electromagnetic clutches is controlled by presence or absence and/or the order of contact of a palm and a thumb to each of the sensors,
a first drive path formed by engaging a first surface-contacting engagement portion provided on the first non-excitation electromagnetic clutch and a fourth surface-contacting engagement portion provided on the right wheel hub is disconnected or connected depending on presence or absence of energization of the first non-excitation electromagnetic clutch,
a second drive path formed by engaging a second surface-contacting engagement portion provided on the second non-excitation electromagnetic clutch and a fifth surface-contacting engagement portion provided on the rotary shaft is disconnected or connected depending on presence or absence of energization of the second non-excitation electromagnetic clutch,
a third drive path formed by engaging a third surface-contacting engagement portion provided on the third non-excitation electromagnetic clutch and a sixth surface-contacting engagement portion provided on the left wheel hub is disconnected or connected depending on presence or absence of energization of the third non-excitation electromagnetic clutch, and
this configuration transmits the rotational force to the wheel on a desired side.

2. A wheelchair having a frame, a right wheel and a left wheel, a right caster and a left caster, and a seat, the wheelchair comprising:
a right-left pair of handrims concentrically disposed with an axle of each wheel and respectively connected to handrim spokes;
a rotary shaft for transmitting a rotational force generated by a rotation of the handrim on one side to a wheel on the opposite side via a drive mechanism; and
a pair of wheel hubs for transmitting the rotational force generated by the rotation of the handrim on the one side to the wheel on the same side via the drive mechanism, wherein
the drive mechanism includes two pairs of right and left sensors respectively disposed on the outer surface of each of the handrims, a first non-excitation electromagnetic clutch disposed on the right side of the wheelchair for transmitting the rotational force to the right wheel, a second non-excitation electromagnetic clutch disposed on the right side or the left side of the wheelchair for transmitting the rotational force to the wheel on the opposite side, and a third non-excitation electromagnetic clutch disposed on the left side of the wheelchair for transmitting the rotational force to the left wheel,
energization of the non-excitation electromagnetic clutches is controlled by presence or absence and/or the order of contact of a palm and a thumb to each of the sensors,
a first drive path formed by engaging a first spur gear or a first internal gear provided on the first non-excitation electromagnetic clutch and a fourth internal gear or a fourth spur gear provided on the right wheel hub is disconnected or connected depending on presence or absence of energization of the first non-excitation electromagnetic clutch, a second drive path formed by engaging a second spur gear or a second internal gear provided on the second non-excitation electromagnetic clutch and a fifth internal gear or a fifth spur gear provided on the rotary shaft is disconnected or connected depending on presence or absence of energization of the second non-excitation electromagnetic clutch, a third drive path formed by engaging a third spur gear or a third internal gear provided on the third non-excitation electromagnetic clutch and a sixth internal gear or a sixth spur gear provided on the left wheel hub is disconnected or connected depending on presence or absence of energization of the third non-excitation electromagnetic clutch, and this configuration transmits the rotational force to the wheel on a desired side.

\* \* \* \* \*